(12) United States Patent
Cho (10) Patent No.: US 9,164,615 B2
(45) Date of Patent: Oct. 20, 2015

(54) DISPLAY DEVICE INTEGRATED WITH TOUCH SCREEN PANEL AND DRIVING METHOD THEREOF

(71) Applicant: Samsung Display Co., Ltd., Yongin, Gyeonggi-Do (KR)

(72) Inventor: Se-Il Cho, Yongin (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 223 days.

(21) Appl. No.: 14/024,218

(22) Filed: Sep. 11, 2013

(65) Prior Publication Data

US 2014/0253493 A1    Sep. 11, 2014

(30) Foreign Application Priority Data

Mar. 7, 2013  (KR) .................. 10-2013-0024312

(51) Int. Cl.
  *G06F 3/045* (2006.01)
  *G06F 3/041* (2006.01)
  *G06F 3/044* (2006.01)

(52) U.S. Cl.
  CPC .............. *G06F 3/0412* (2013.01); *G06F 3/044* (2013.01); *G06F 3/0416* (2013.01)

(58) Field of Classification Search
  CPC ...... G06F 3/0412; G06F 3/0416; G06F 3/044
  USPC ........................................................ 345/174
  See application file for complete search history.

(56) References Cited

U.S. PATENT DOCUMENTS

| | | | |
|---|---|---|---|
| 8,035,581 B2 * | 10/2011 | Choi .............................. | 345/76 |
| 8,373,687 B2 * | 2/2013 | Kwon ........................... | 345/204 |
| 2006/0248421 A1 * | 11/2006 | Choi ............................. | 714/731 |
| 2008/0062147 A1 | 3/2008 | Hotelling et al. | |
| 2008/0218650 A1 * | 9/2008 | Koshihara et al. ............. | 349/39 |
| 2010/0111466 A1 * | 5/2010 | Doerr et al. ........................ | 385/3 |
| 2011/0084955 A1 * | 4/2011 | Kim ............... | 345/212 |
| 2011/0216056 A1 * | 9/2011 | Yoo et al. ...................... | 345/212 |
| 2012/0086879 A1 * | 4/2012 | Yu et al. ......................... | 349/33 |
| 2012/0212517 A1 * | 8/2012 | Ahn ............................... | 345/690 |
| 2012/0218482 A1 * | 8/2012 | Hwang et al. .................. | 349/12 |
| 2012/0256861 A1 * | 10/2012 | Park .............................. | 345/173 |

(Continued)

FOREIGN PATENT DOCUMENTS

KR  10-2006-0112994 A  11/2006
KR  10-2012-0094734 A  8/2012

*Primary Examiner* — Temesgh Ghebretinsae
*Assistant Examiner* — Benyam Ketema
(74) *Attorney, Agent, or Firm* — Robert E. Busnell, Esq.

(57) ABSTRACT

A display device integrated with a touch screen panel includes a plurality of pixels. Each pixel includes a first and second pixel electrodes. The display device also includes first touch electrodes formed parallel to a first direction. Each first touch electrode is integrally formed with the second pixel electrodes. The display device includes second touch electrodes formed parallel to a second direction intersecting the first direction and spaced apart from the first touch electrodes. The display device supplies an emission control signal controlling pixels not to emit light to each emission control line at least twice during one frame period, and supplies a touch driving signal to the first touch electrode connected with the pixels receiving the emission control signal while supplying a second pixel power to the remaining first touch electrodes connected with the pixels not receiving the emission control signal at a time in the frame period.

14 Claims, 5 Drawing Sheets

(56) References Cited

U.S. PATENT DOCUMENTS

| | | | |
|---|---|---|---|
| 2012/0256971 A1* | 10/2012 | Shin et al. | 345/690 |
| 2013/0057511 A1* | 3/2013 | Shepelev et al. | 345/174 |
| 2013/0321292 A1* | 12/2013 | Jeon | 345/173 |
| 2013/0341651 A1* | 12/2013 | Kim et al. | 257/84 |
| 2013/0342479 A1* | 12/2013 | Pyo et al. | 345/173 |
| 2014/0049508 A1* | 2/2014 | Kim et al. | 345/174 |
| 2014/0085222 A1* | 3/2014 | Park et al. | 345/173 |
| 2014/0111446 A1* | 4/2014 | Lee et al. | 345/173 |
| 2014/0160061 A1* | 6/2014 | Kim et al. | 345/174 |
| 2014/0210767 A1* | 7/2014 | Hur | 345/174 |

* cited by examiner

DISPLAY DEVICE INTEGRATED WITH TOUCH SCREEN PANEL AND DRIVING METHOD THEREOF

CLAIM OF PRIORITY

This application claims priority under 35 U.S.C. §119 of Korean Patent Application No. 10-2013-0024312, filed on Mar. 7, 2013, in the Korean Intellectual Property Office, the entire contents of which are incorporated herein by reference in their entirety.

BACKGROUND OF THE INVENTION

1. Field of the Invention

Embodiments of the present invention generally relate to a display device integrated with a touch screen panel and a driving method thereof, and more particularly, to a display device integrated with a touch screen panel including a common electrode which serves as a touch electrode and a pixel electrode and a driving method thereof.

2. Description of the Related Art

A touch screen panel is an input device capable of inputting a user's instruction by selecting instruction contents displayed on a screen of a display device such as a liquid crystal display (LCD) or an organic light emitting diode (OLED) display, with a human hand or an object.

The touch screen panel may be provided on a front face of the display device to convert a contact position that the human hand or the object directly contacts into an electric signal. Therefore, an instruction content selected at the contact position is recognized as an input signal.

Since the touch screen panel as described above may replace a separate input device operated by being connected to the display device such as a keyboard and a mouse, a use range of the touch screen panel has gradually increased.

SUMMARY OF THE INVENTION

One or more embodiments provide a display device integrated with a touch screen panel and a driving method thereof capable of forming the touch screen panel and the display device integrally with each other.

In an embodiment, a display device integrated with a touch screen panel may include a pixel unit including scan lines and data lines intersecting with each other, emission control lines in parallel with the scan lines, and a plurality of pixels connected to the scan lines, the emission control lines, and the data lines. The pixel unit includes a first and second pixel electrodes. The display device integrated with a touch screen panel may include first touch electrodes integrally formed with the second pixel electrode in the first direction on the pixel unit in accordance with a patterning form of the second pixel electrode in a first direction.

The display device integrated with a touch screen panel may also include second touch electrodes formed on the pixel unit in the second direction and disposed opposite to be space apart from the first touch electrodes. The display device integrated with a touch screen panel supplies an emission control signal controlling pixels not to emit light to each of the emission control lines at least twice during one frame period, and supplies a touch driving signal to the first touch electrode connected with the pixels receiving the emission control signal while supplying a second pixel power to the remaining first touch electrodes connected with the pixels not receiving the emission control signal at a time in the frame period.

The first touch electrodes may be formed in same direction with the scan lines and the emission control lines, and each of the first touch electrodes may be overlapped with the plurality of pixel lines in which the plurality of scan lines and emission control lines are disposed.

The emission control lines coupled to the pixels connected to the same first touch electrode may be configured to receive the emission control signal at the same time.

The emission control lines of the pixels connected to at least two of the first touch electrodes adjacent to each other may be configured to receive the emission control signal at the same time.

The emission control lines coupled to the pixels connected to the same first touch electrode may be electrically connected.

Each of the pixels may be configured to include at least an organic light emitting diode, and the first and second pixel electrodes may be an anode electrode and a cathode electrode of the organic light emitting diode, respectively.

The anode electrode may be patterned being divided into a pixel unit, and the cathode electrode may be patterned being divided into the first touch electrode unit.

The first pixel power may be supplied to the first pixel electrode, and the second pixel power and the touch driving signal may be alternately supplied to the second pixel electrode.

The display device may be configured to sense a touch input by detecting the change of the capacitance applied to the second touch electrodes corresponding to the touch driving signal supplied to the first touch electrode.

In an embodiment, a driving method of a display device integrated with a touch screen panel may include sequentially supplying a touch driving signal to a plurality of first touch electrodes integrally formed with a pixel electrode in the same direction with scan lines and emission control lines, and detecting the change in the capacitance applied to second touch electrodes spaced apart by intersect with the first touch electrodes to sense a touch input when the touch driving signal is supplied. The driving method of a display device integrated with a touch screen panel may further includes supplying an emission control signal controlling pixels not to emit light to each of the emission control lines at least twice during one frame period, and supplying a touch driving signal to the first touch electrode connected with the pixels receiving the emission control signal while supplying a second pixel power to the remaining first touch electrodes connected with the pixels not receiving the emission control signal at a time in the frame period.

Each of the first touch electrodes may be overlapped with a plurality of pixel lines in which the plurality of scan lines and emission control lines are disposed, and the same emission control signal may be supplied to the emission control lines coupled to the pixels connected to the same first touch electrode at the same time.

The emission control lines of the pixels connected to at least two adjacent first touch electrodes may be configured to receive the same emission control signal at the same time.

The first touch electrodes may sequentially receive the touch driving signal while the emission control signal is supplied.

The method may further include sequentially supplying scanning signals to the scan lines in order to select pixels in a row, supplying data signals to the selected pixels, and controlling a light emitting periods of the pixels by supplying the emission control signal to each of the emission control lines in parallel with the scan lines, at least twice in one frame period.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTION

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Figure 1:
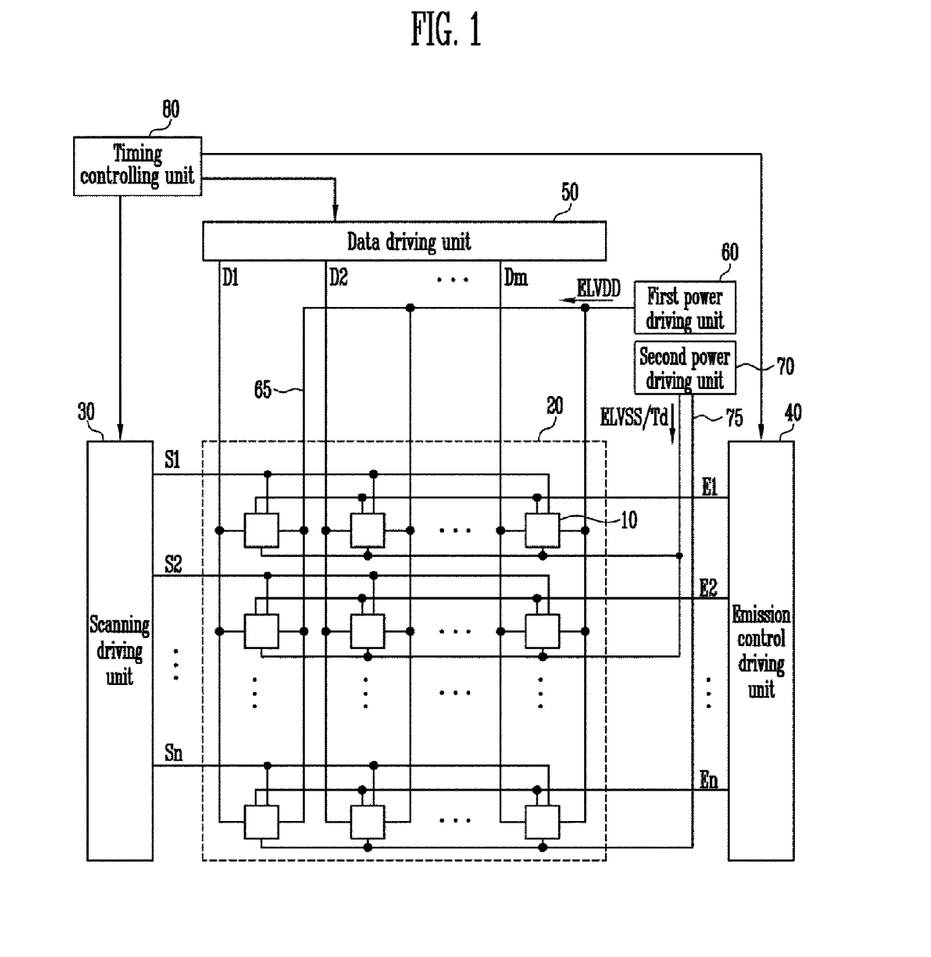
FIG. 1 is a view showing a pixel unit of a display device integrated with a touch screen panel and a driving circuit unit for driving the pixel unit constructed as an embodiment according to the principles of the present invention.
Figure 2:
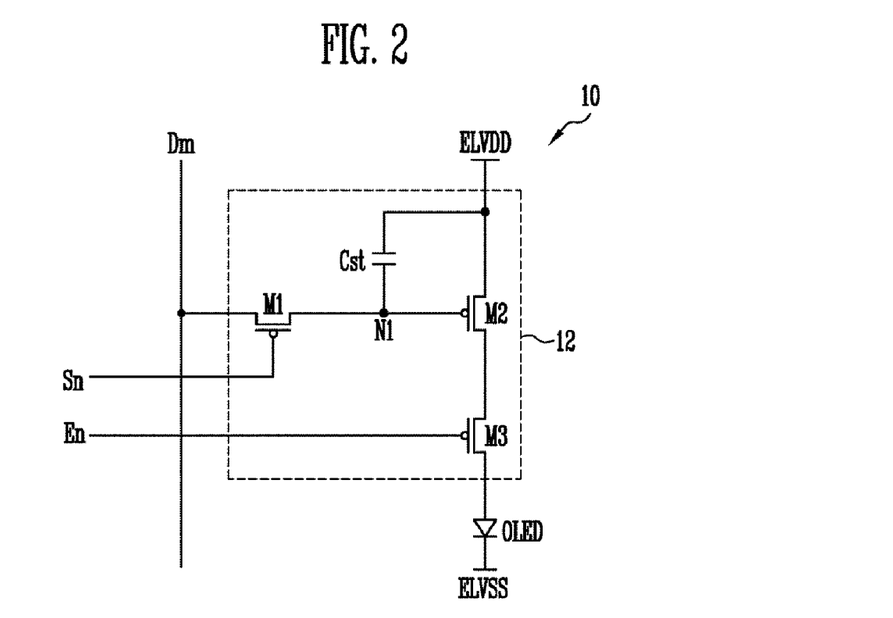
FIG. 2 is a view showing an example of a pixel shown in FIG. 1.

FIG. 1 is a view showing a pixel unit of a display device integrated with a touch screen panel and a driving circuit unit for driving the pixel unit constructed as an embodiment according to the principles of the present invention. FIG. 2 is a view showing an example of a pixel shown in FIG. 1 and shows a structure of the pixel connected to n scanning line Sn, n emission control lines En, and m data line Dm in FIG. 2 for convenience.

First, referring to FIG. 1, a display device integrated with a touch screen panel constructed as an embodiment according to the principles of the present invention may include a pixel unit 20, a scanning driving unit 30, an emission control driving unit 40, a data driving unit 50, a first power driving unit 60, a second power driving unit 70, and a timing controlling unit 80.

The pixel unit 20 includes scan lines S1 to Sn and data line D1 to Dm intersecting with each other, emission control lines E1 to En formed in parallel with the scan lines S1 to Sn, and a plurality of pixels 10 arranged in portions at which the scan lines S1 to Sn, the data lines D1 to Dm, and the emission control lines E1 to En intersect with each other to be connected thereto.

For example, each pixel 10 includes an organic light emitting diode (OLED) and a pixel circuit 12 for driving the OLED as shown in FIG. 2.

The OLED includes a first pixel electrode, a second pixel electrode, and an organic emission layer interposed therebetween. Here, the first pixel electrode and the second pixel electrode are different from each other; for example, when the first pixel electrode is set as an anode electrode, the second pixel electrode is set as a cathode electrode. The first pixel electrode of the OLED is connected to a first pixel power ELVDD via the pixel circuit 12, and the second pixel electrode of the OLED is connected to a second pixel power ELVSS. Such OLED emits light of a luminance corresponding to a driving current supplied from the pixel circuit 12.

The pixel circuit 12 may be configured to include a first to third transistors M1 to M3 and a storage capacitor Cst.

A first electrode of the first transistor M1 is connected to the data line Dm and a second electrode thereof is connected to a first node N1. Here, the first electrode and the second electrode are different from each other; for example, when the first electrode is set as a source electrode, the second electrode is set as a drain electrode. In addition, a gate electrode of the first transistor M1 is connected to the scanning line Sn. The first transistor M1 is turned on when a scanning signal of a voltage (for example, a low voltage) that the first transistor M1 may be turned on from the scanning line Sn is supplied to connect the data line Dm and the first node N1. At this time, a data signal of the corresponding pixel 10 is supplied to the data line Dm. Therefore, the data signal is transferred to the first node N1. The data signal transferred to the first node N1 is charged in the storage capacitor Cst.

The first electrode of the second transistor M2 is connected to the first pixel power ELVDD, and the second electrode thereof is connected to the anode electrode of the OLED via a third transistor M3. In addition, a gate electrode of the second transistor M2 is connected to the first node N1. The second transistor M2 controls an amount of the driving current supplied to the OLED corresponding to the voltage of the first node N1.

The first electrode of the third transistor M3 is connected to the second electrode of the second transistor M2, and the second electrode thereof is connected to the anode electrode of the OLED. In addition, a gate electrode of the third transistor M3 is connected to the emission control line En. The third transistor M3 is turned off during non-light-emitting period in which the emission control signal of a voltage (for example, a high voltage) that the third transistor M3 may be turned off from the emission control line En is supplied to thereby block the driving current flowing to the OLED, and is turned on during light-emitting period in which the supply of the emission control signal is stopped, such that the driving current is supplied from the second transistor M2 to the OLED. That is, the emission control signal is supplied in order to control the connection between the pixel circuit 12 and the OLED. Furthermore, the emission control signal blocks the driving current flowing from the pixel circuit 12 to the OLED during a predetermined non-light-emitting period, for example, a data writing period.

One electrode of the storage capacitor Cst is connected to the first pixel power ELVDD, and the other one electrode thereof is connected to the first node N1. The storage capacitor Cst charges the voltage corresponding to the data signal supplied to the first node N1 and maintains the charged voltage until the data signal of a next frame is input.

Meanwhile, although FIG. 2 shows the pixel 10 having a relatively simple structure including the first transistor M1 and the storage capacitor Cst in order to input and store the data signal, the second transistor M2 in order to supply the driving current corresponding to the data signal to the OELD, and the third transistor M3 in order to control the light emitting period of the pixel 10, for convenience, it is only an example for describing the present invention. Therefore, the present invention is not limited thereto. The pixel circuit 12 may further include other circuit elements such as a transistor element for compensating a threshold voltage of the second transistor M2, a transistor element to initialize the first node N1, and the like.

The pixel 10 is selected by the scanning signal supplied from the scanning line Sn during the scanning period of a corresponding horizontal line to receive the data signal from the data line Dm. Furthermore, the light-emitting period is controlled in response to the emission control signal supplied from the emission control line En.

In this case, the connection between the second transistor M2 and the OLED is blocked during the non-light-emitting period in which the emission control signal turning off the third transistor M3 is supplied, such that a current path of the driving current in the pixel 10 is blocked. In addition, the current path of the driving current is formed toward the second pixel power ELVSS via the second transistor M2, the third transistor M3, and the OLED from the first pixel power ELVDD during the light-emitting period in which the third transistor M3 is turned on such that the OLED emits the light of the luminance corresponding to the data signal (however, it does not emit the light in the case in which the data signal for displaying a black is supplied).

Referring to FIG. 1 again, the scanning driving unit 30 selects the pixel line (the horizontal pixel line) receiving the data signal each of the horizontal periods within one frame while being supplying the scanning signal to the scan lines S1 to Sn.

For this, the scanning driving unit 30 may sequentially select the scan lines S1 to Sn while being supplying the scanning signal sequentially shifted to the scan lines S1 to Sn.

The emission control driving unit 40 performs to control the light in emitting of the pixels 10 in at least a pixel line unit while being supplying the emission control signal to the emission control lines E1 to En. For example, the emission control driving unit 40 supplies the emission control signal to emission control line E of the corresponding pixel line during the predetermined non-light-emitting period including the data input period of each pixel line so as not to emit the light of the pixels 10.

The emission control driving unit 40 according to the embodiment supplies the emission control signal to each of emission control lines E1 to En at least twice during one frame period. That is, the emission control driving unit 40 according to the embodiment divides several times the emission control signal during one frame period to supply the emission control signal to the emission control line. Accordingly, each of the emission control lines E1 to En receives the plurality of the emission control signal that does not emit the light of the pixels 10 during one frame period, and thus, a plurality of light-emitting period and non-light-emitting period are presented within one frame period.

Meanwhile, during the period in which the emission control signal is supplied, a touch driving signal Td is supplied to the second power line 75 connected with the pixels 10 receiving the emission control signal during at least one the period within the corresponding period, and the second pixel power ELVSS is supplied to the second power line 75 connected with the remaining pixels 10 that does not supply the emission control signals.

That is, the second power line 75 for supplying the second pixel power ELVSS to the second pixel electrode alternately receives the second pixel power ELVSS and the touch driving signal Td. The second pixel electrode may serve as the pixel electrode configured to supply the second pixel power ELVSS to the pixels 10 and the first touch electrode configured to supply the touch driving signal Td. To this end, instead of entirely forming on the pixel unit 20, the second pixel electrode may be patterned to form a plurality of the first touch electrodes formed in a first direction, for example, a direction that is in parallel with the scan lines S1 to Sn and the emission control lines E1 to En.

The touch driving signal Td may be supplied to only the second pixel electrode connected with the pixels 10 receiving the emission control signal among the periods in which the emission control signal are supplied. Since the pixels 10 receiving the emission control signal are set in the non-light emitting state in which the driving current does not flows, the touch driving signal Td may be supplied to the second pixel electrode of the pixels 10.

In addition, the remaining pixels 10, that is, the pixels that do not supply the emission control signal during corresponding horizontal period is set in the light-emitting state in which it emits the light of the luminance corresponding to the data signal. Furthermore, since the second pixel power ELVSS is supplied to the second pixel electrode connected with the pixels 10, the pixels 10 may normally emit the light of luminance corresponding to the data signal.

Meanwhile, since the first touch electrode integrally formed with the second pixel electrode does not need to be formed with the degree of precision required for the pixels, each of the first touch electrodes may be formed so as to overlap the plurality of the pixel lines at which the plurality of the scan lines S and emission control lines E are disposed in parallel with each other.

In this case, since the same touch driving signal Td is supplied at the same time to the second pixel electrodes of the pixels (10) connected to the same first touch electrode, the emission control signal should be supplied to the pixels 10 during the touch driving period in which the touch driving signal Td is supplied.

To this end, the emission control signals being overlapped at least during the period in which the touch drive signal Td is supplied is supplied to the emission control lines E connected to the pixels 10 connected to the same first touch electrode. For example, the emission control lines E of the pixels 10 connected to the same first touch electrode may be supplied at the same time the same emission control signal.

That is, the emission control driving unit 40 may supply at this time the same emission control signal to the plurality of the emission control lines E. In this case, the plurality of the emission control lines E may be configured to electrically connect to each other.

An operation of the emission control driving unit 40 may be controlled together with the drive of the touch screen panel, and a detailed description thereof will be provided below.

The data driving unit 50 generates the data signal corresponding to the data transferred from the timing controlling unit 80 to supply the generated data signal to the pixels 10 through the data lines D1 to Dm.

The first power driving unit 60 supplies the first pixel power ELVDD to the pixel 10 through the first power line 65.

For example, the first power driving unit 60 may be implemented by a DC-DC converter converting the power supplied from the outside into the first pixel power ELVDD. The first pixel power ELVDD supplied from the first power driving unit 60 is transferred to the first pixel electrode of the OLED at least during the light-emitting period of the pixels 10.

The second power driving unit 70 supplies the second pixel power ELVSS or the touch driving signal Td to each pixel 10 through the second power line 75. However, the second power line 75 according to the embodiment of the present invention is connected to the second pixel electrode integrally implemented with the first touch electrode and may be implemented to divide into the plurality of the power lines in order to the supply the touch driving signal Td to each of the first touch electrodes during the different periods. Therefore, the second pixel power ELVSS and the touch driving signal Td may be alternately supplied to the second pixel electrode. For example, the second pixel power ELVSS may be supplied to the second pixel electrode during the light-emitting period of the corresponding pixels 10, and the touch driving signal Td may be supplied to the second pixel electrode during at least partial period of the non-light-emitting period of the corresponding pixels 10.

However, the pixels 10 according to the embodiment of the present invention receive the emission control signal divided several times and supplied during one frame period. In addition, each touch driving signal Td is supplied during the plurality of the non-light-emitting period, and thus, the plurality of the touch driving period is disposed within one frame period. Accordingly, the driving frequency of the touch screen panel is increased, such that the response speed of touch screen panel is improved effectively. A detailed description of the driving method of the display device integrated with the touch screen panel according to the exemplary embodiment of the present invention will be provided below.

The timing controlling unit 80 controls the scanning driving unit 30, the emission control driving unit 40, and the data driving unit 50, corresponding to the control signal supplied from the outside. In addition, the timing controlling unit 80 may additionally control the first power driving unit 60 and/or the second power driving unit 70.

Figure 3:
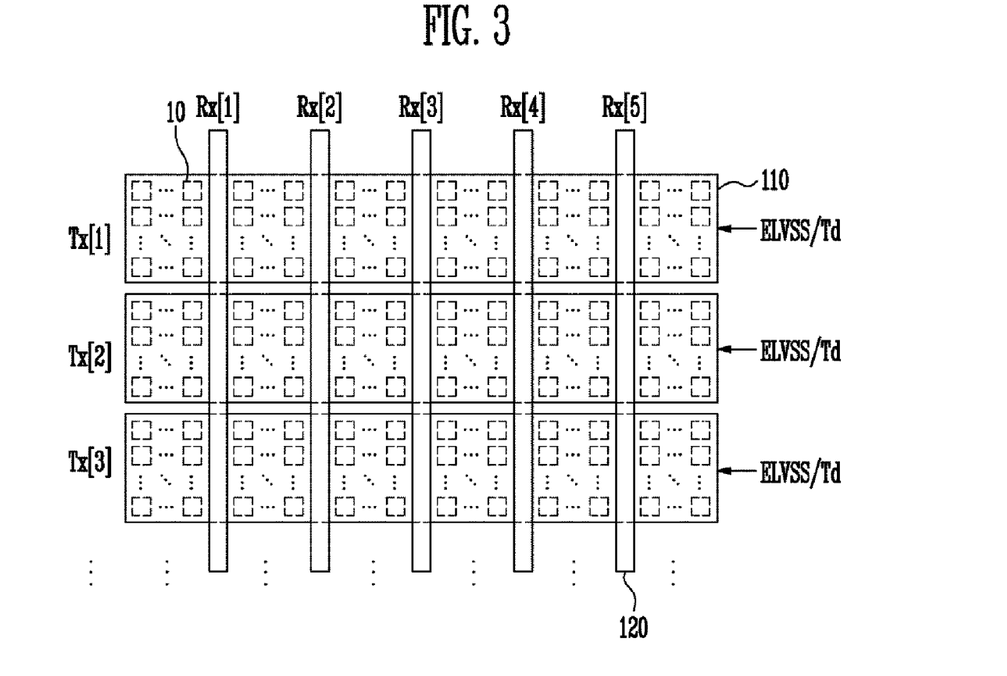
FIG. 3 is a view showing touch electrodes of a display device integrated with a touch screen panel according to the embodiment of the present invention.
Figure 4:
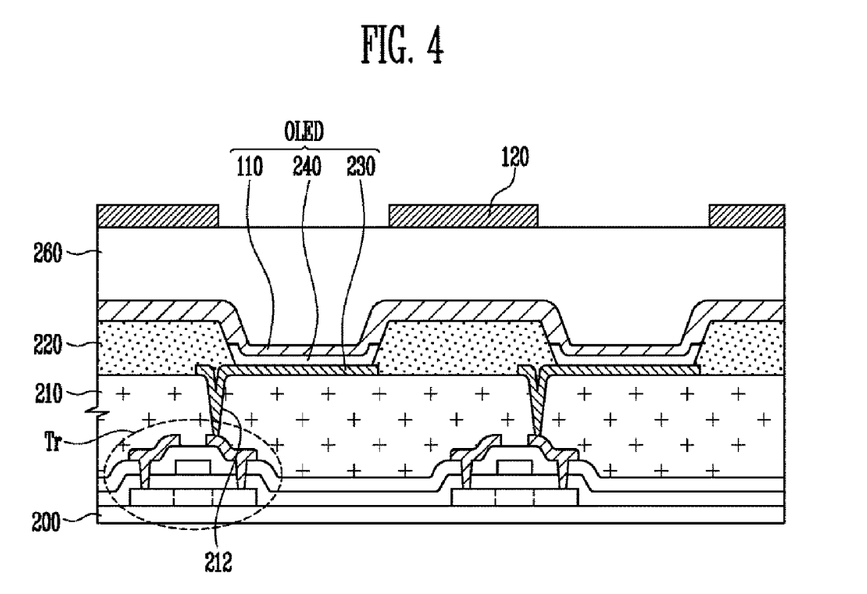
FIG. 4 is a main cross-section view of a display device integrated with a touch screen panel according to the exemplary embodiment of the present invention.

FIG. 3 is a view showing touch electrodes of a display device integrated with a touch screen panel according to the embodiment of the present invention. And, FIG. 4 is a main cross-section view of a display device integrated with a touch screen panel according to the embodiment of the present invention. For convenience, although FIG. 4 show a case in which a second touch electrode is formed every vertical pixel line, but only shows a position of the second touch electrode. The present invention is not limited thereto. For example, a plurality of vertical pixel lines may be formed between two immediately adjacent second touch electrodes as shown in FIG. 3. Meanwhile, although FIGS. 3 and 4 show a capacitive type touch screen panel as an example thereof, the technical idea of the present invention is not necessarily limited thereto.

First, referring to FIG. 3, the touch electrodes for implementing the touch screen panel include common electrodes 110 which serve as first touch electrodes formed in a first direction (for example, a horizontal direction) and second touch electrodes 120 formed in a second direction intersecting with the first direction (for example, a vertical direction). The common electrodes 110 and the second touch electrodes 120 are spaced from each other and are disposed to be opposite to form the capacitance. In addition, each common electrode 110 also serves as one of first pixel electrode and second pixel electrode of a plurality of organic light emitting diodes (OLED) of pixels 10 formed in a same region as the respective common electrode 110, which will be explained in detail with reference to FIG. 4.

For example, the common electrode 110 serving as the first touch electrode is set as a Tx electrode receiving the touch driving signal Td and the second touch electrode 120 is set as a Rx electrode for detecting a change of the capacitance according to the touch driving signal Td.

In this case, for example, the touch driving signal Td may be set as a rectangular waveform swing between a first voltage and a second voltage, and the touch screen panel may be implemented as a mutual capacitance type touch screen panel by detecting the change of the capacitance applied to the second touch electrodes 120 when the voltage of the touch driving signal Td supplied to the common electrode 110, which serves as the first touch electrode, is changed to sense whether the touch screen panel is touched and to sense a touch position.

The common electrodes 110, which serve as the first touch electrodes, and second touch electrodes 120 may be formed on the pixel unit where an image is displayed. That is, the pixels 10 are disposed at the lower portion of the common electrodes 110, which serve as the first touch electrodes, and second touch electrodes 120. Accordingly, it is preferable that common electrodes 110, which serve as the first touch electrodes, and second touch electrodes 120 are implemented transparently so that light illuminated from the pixels 10 may penetrate. To this end, the common electrodes 110, which serve as the first touch electrodes, and second touch electrodes 120 may be made of a transparent conductive material, the present invention is not limited thereto. The common electrodes 110, which serve as the first touch electrodes, and second touch electrodes 120 may be made of other conductive material such an opaque metal that a thickness, a width, a pattern shape, or the line is adjusted. For example, the common electrodes 110, which serve as the first touch electrodes, and second touch electrodes 120 may be made of the conductive material such as indium tin oxide (ITO), indium zinc oxide (IZO), graphene, carbon nano tube (CNT), silver nanowires (AgNWs), or the like.

Meanwhile, the plurality of the common electrodes 110, which serve as the first touch electrodes, and second touch electrodes 120 may be provided with a degree of precision capable of sufficiently recognizing the touch input and need not to be provided one by one every horizontal line and vertical line of pixel unit 20.

For example, the common electrodes 110, which serve as the first touch electrodes, may be disposed so as to overlap with a plurality of the horizontal pixel lines. In this case, each common electrode 110, which serves as the first touch electrode, may be formed so as to overlap with a plurality of horizontal pixel lines in which the scan lines S1 to Sn and the emission control lines E are disposed shown in FIG. 1.

In addition, the second touch electrodes 120 may be disposed one by one every the plurality of the vertical pixel lines. In this case, a plurality of vertical pixel lines are formed between two immediately adjacent second touch electrodes 120. Meanwhile, although FIG. 3 has shown an example in which the second touch electrodes 120 are disposed so as not to overlap with the pixels 10, the second touch electrodes 120 may be disposed so as to overlap with the pixels 10 in the case in which a transparency of the second touch electrodes 120 are sufficiently secured.

However, according to the embodiment of the present invention, either the first or the second touch electrode may be integrally implemented with the pixel electrode provided to the pixels 10, for example, the second pixel electrode. In this case, each second touch electrode 120 serves as one of first pixel electrode and second pixel electrode of a plurality of organic light emitting diodes (OLED) of pixels 10 formed in a same region as the respective second touch electrode 120.

For example, the common electrodes 110, which serves as the first touch electrodes, may be integrally implemented in a form which the second pixel electrode provided to the pixels 10 is patterned in the first direction.

In relation to this, describing first a structure of the pixel 10, the pixel 10 includes an organic light emitting diode (OLED) and a transistor Tr (for example, a third transistor M3 of FIG. 2) connected thereto as shown in FIG. 4. For convenience, FIG. 4 will show only the organic light emitting diode (OLED) and the transistor Tr directly connected thereto.

The transistor Tr is formed on a substrate 200 such as glass, plastic, silicon or synthetic resin and a planar layer 210 is formed on the transistor Tr.

The planar layer 210 may be formed of an insulating material such as a nitride film, an oxide film, or the like.

An organic light emitting diode (OLED) is formed on the planar layer 210. The OLED may include a first pixel electrode (anode electrode) 230 connected with the transistor Tr through the contact holes 212 which is formed in the planar layer 210, the common electrode 100 which serves as second pixel electrode (cathode electrode), and a light emitting layer 240 interposed between the first pixel electrode 230 and the common electrode 110. As discussed above, the common electrode 110 may also work as the first touch electrode with reference to FIG. 3.

Meanwhile, the first pixel electrode 230 may be divided into a pixel 10 and then patterned, and a pixel defined layer 220 may be formed between the pixels adjacent to each other. The pixel defined layer 220 may be made of an organic insulating material such as an acryl based an organic compound, a polyamide, a polyimide, or the like, but, the present invention is not limited thereto. Therefore, the pixel defined layer 220 may be formed of an insulating material of various materials.

If the common electrode 110 acts as the second pixel electrode in order to only display an image on the display device, a layer which forms the common electrode 110 needs not to be divided and patterned. In other words, only one common electrode 110 for the entire pixels 10 is required in order to display an image on the display device. On the other hand, in order to configure the common electrode 110 to also act as the first touch electrode as shown in FIG. 3, the layer which forms the common electrode 110 may be divided into a plurality of patterns such that a plurality of common electrodes 110 may be arranged in the second direction in a form of long patterned in the first direction. That is, the layer which forms the common electrodes 110 is divided and then patterned.

As shown FIG. 4, the common electrode 110 may serve as the cathode electrode receiving the second pixel power ELVSS during light-emitting period of the pixel 10, and as shown in FIG. 3, the common electrode 110 serves as the first touch electrode receiving the touch driving signal Td during at least one period among the non-light emitting periods of the pixel 10. That is, the second pixel power ELVSS and the touch driving signal Td may be alternately supplied to the common electrode 110.

An insulating member 260 is formed on the common electrode 110, and the second touch electrodes 120 are formed on the insulating member 260. Here, the insulating member 260 is stably disposed to be spaced apart from each other the common electrode 110 that serves as even the first touch electrode and the second touch electrodes 120. Although FIG. 4 shows the case in which the insulating member 260 is entirely formed on the common electrode 110, the present invention is not necessarily limited thereto. For example, a plurality of the insulating member 260 may also be implemented in a spacer form to be locally disposed.

As shown in FIG. 3, the plurality of the second touch electrode 120 may be arranged in the first direction in the form the long patterned in the second direction so as to intersect with the common electrodes 110. For example, the second touch electrodes 120 as described above may be disposed on the pixel defined layer 220, which is non-light-emitting.

As described above, the display device integrated with the touch screen panel according to the embodiment of the present invention may be used as the touch electrodes (for example, the first touch electrodes) for implementing of the touch screen panel by patterning the layer which forms the pixel electrode (for example, the second pixel electrode) provided to the pixel 10 in order to display the image. Therefore, the display device integrated with the touch screen panel having a simple structure may be provided.

However, the display device integrated with the touch screen panel according to the embodiment of the present invention detects the change of the capacitance applied to the second touch electrodes 120 while sequentially supplying the touch driving signal Td to the common electrodes 110 to sense whether the touch screen panel is touched and the touch position. In addition, the common electrode of the display device integrated with the touch screen panel serves as the pixel electrode by supplying the second pixel power ELVSS to a remaining common electrode except for the common electrode receiving the touch driving signal Td during corresponding period among the common electrodes 110.

Consequently, the touch screen panel may drive at the same time during the image display period displaying the image, to thereby increase the efficiency of a time application. Accordingly, the touch screen panel may stably drive the touch screen panel by sufficiently ensuring the driving time of the touch screen panel.

Furthermore, according to the embodiment of the present invention, the plurality of the emission control signals are supplied to each of the emission control lines E1 to En during one frame period and the touch driving signals Td are supplied to the common electrodes 110 during each period in which the plurality of emission control signals are supplied, such that the plurality of the touch driving periods are disposed within one frame period. As a result, the driving frequency of the touch screen panel increases, thereby making it possible to improve the response speed.

Hereinafter, a driving method of the display device integrated with the touch screen panel according to the embodiment of the present invention will be described in detail with reference to the examples shown in FIGS. 5 and 6.

Figure 5:
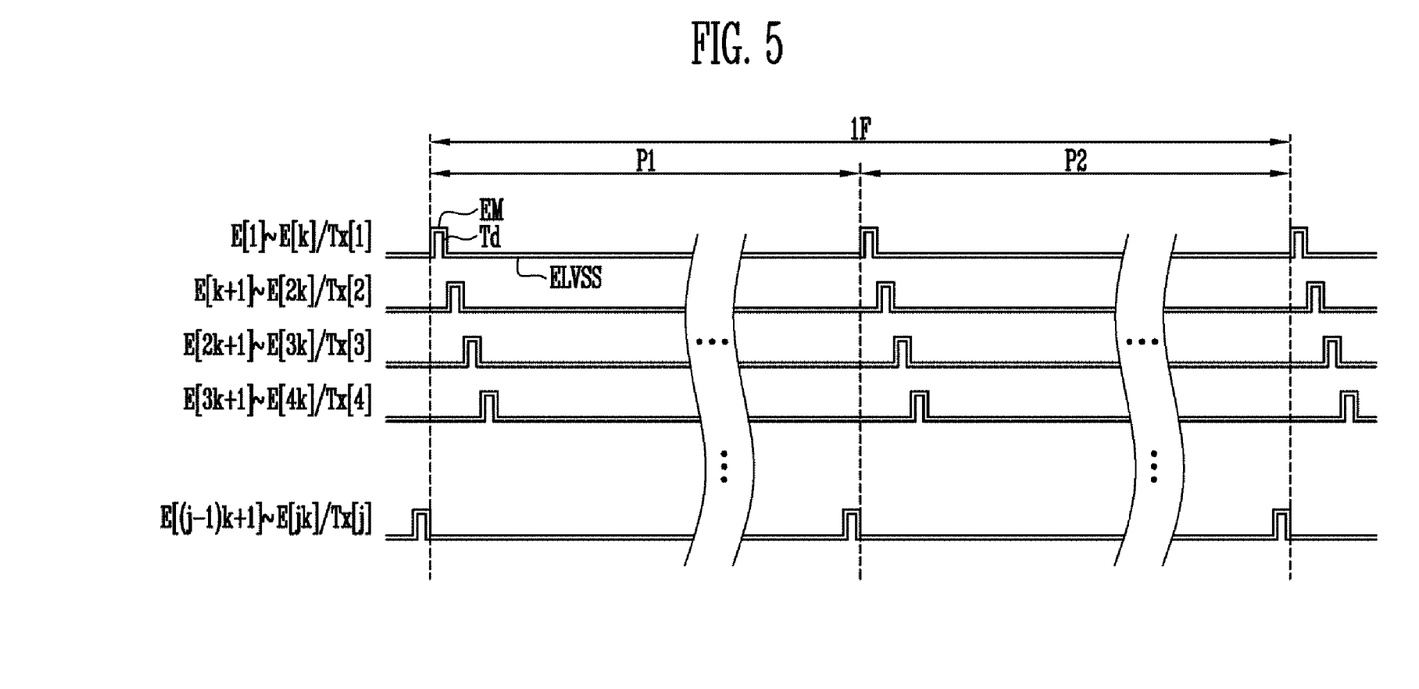
FIG. 5 is a waveform view showing a driving method of a display device integrated with a touch screen panel according to the embodiment of the present invention.

FIG. 5 is a waveform view showing a driving method of a display device integrated with a touch screen panel according to the embodiment of the present invention. However, FIG. 5 shows an example formed so that each touch electrode Tx is overlapped with the plurality of the light-emitting control line E. In addition, FIG. 5 shows to overlap the touch driving signal Td and the second pixel power ELVSS supplied to the touch electrode Tx and the emission control signal EM supplied to the emission control lines E overlapped with each the first touch electrode Tx in order to clearly indicates the light-emitting control lines E overlapped to each of the touch electrodes Tx. However, in FIG. 5 as described above, the touch driving signal Td and a relative voltage level between the second pixel power ELVSS and the light-emitting control signal are not reflected and may be variously changed.

Referring to FIG. 5, a plurality of light emitting control signal EM is supplied to the pixels through each of the light emitting control lines E during one frame 1F period.

For example, one frame 1F period is divided into a first period P1 and a second period P2, and the emission control signal EM may be supplied to each of the emission control lines E once in the first period P1 and once in the second period P2. That is, according to the embodiment of the present invention, the emission control signal EM may be divided and then supplied at least twice during one frame 1F period. Therefore, the pixels may have at least two light-emitting periods and two non-light-emitting periods during one frame 1F period.

In addition, the touch driving signal Td is supplied to the first touch electrode Tx connected with the pixels to corresponding period among each of the non-light-emitting periods in which the emission control signal EM is supplied, that is, the non-light-emitting period of the pixels receiving the emission control signal EM, and the second pixel power ELVSS is supplied to the first touch electrodes Tx connected with the remaining first touch electrodes Tx, that is, the remaining pixels that the emission control signal EM does not supply during the corresponding period.

For example, during at least partial period of the period in which the emission control signal EM having the high voltage is supplied to the emission control lines E1 to E[k] overlapped with the first touch electrode Tx[1] disposed to the first horizontal line based on a horizontal line of the first touch electrode Tx unit, the touch driving signal Td is supplied to the first touch electrode Tx[1] disposed to the first horizontal line, and the second pixel power ELVSS is supplied to the first touch electrodes Tx[2] to Tx[j] disposed to the remaining horizontal line.

Then, since the current path of the driving current is not formed in the pixels disposed to the 1 to k horizontal line receiving the emission control signal EM, the touch driving signal Td may be supply to the second pixel electrode of the pixels, that is, the first touch electrode Tx[1]. When the touch driving signal Td is supplied to the first touch electrode Tx[1] of a first horizontal line, the touch input applied to the first touch electrode Tx[1] of the first horizontal line may sense by detecting the change in capacitance applied to the second touch electrode.

Thereafter, during at least partial period of the period in which the emission control signal EM having the high voltage is supplied to the emission control lines E[k+1] to E[2k] overlapped with the first touch electrode Tx[2] disposed to a second horizontal line based on a horizontal line of the first touch electrode Tx unit, the touch driving signal Td is supplied to the first touch electrode Tx[2] of the second horizontal line disposed to the first horizontal line, and the second pixel power ELVSS is supplied to the first touch electrodes Tx[1], Tx[3] to Tx[j] disposed to the remaining horizontal lines. Secondly, when the touch driving signal Td is supplied to the first touch electrode Tx[2] of the second horizontal line, the touch input applied to the first touch electrode Tx[2] of the second horizontal line may sense by detecting the change in capacitance applied to the second touch electrode.

As described above, the present invention drives the touch screen panel while sequentially selecting the first touch electrodes Tx with respected to the first period P1 and the second period P2 to drive the touch screen panel simultaneously, since the remaining pixels are not selected during the corresponding horizontal period generates the light of the luminance corresponding to the data signal to thereby display the image.

That is, the present invention sequentially supplies the touch driving signal Td to the first touch electrodes Tx to sense whether the touch screen panel is touched and to sense a position, and supplies the second pixel power ELVSS to the remaining first touch electrodes other than the first touch electrode receiving the touch driving signal Td in corresponding period among the first touch electrodes Tx to allow the remaining first touch electrodes other than the first touch electrode receiving the touch driving signal Td to serve as the second pixel electrode, thereby making it possible to simultaneously drive the touch screen panel during the period in which the image is displayed. Therefore, according to the embodiment of the present invention increases the efficiency of a time application and secures the driving time to thereby stably drive the touch screen panel.

In addition, according to the embodiment of the present invention, one frame 1F period is divided into at least two periods P1 and P2. Further, the emission control signal EM is supplied to the emission control lines E[1] to E[jk] during each of the periods, and the touch driving signal Td is supplied to the first touch electrodes Tx during the period in which the emission control signal EM is supplied, such that the plurality of the touch driving periods are disposed within the one frame 1F. As a result, the driving frequency of the touch screen panel increases, thereby making it possible to improve the response speed.

Meanwhile, the emission control signal EM supplied to the emission control lines E[1] to E[k], E[k+1] to E[2k], ..., E[(j−1)k+1] to E[jk] disposed in an area where the same first touch electrode Tx is formed overlaps at least during the period in which the touch driving signal Td is supplied to the corresponding first touch electrode Tx.

For example, the emission control lines E[1] to E[k], E[k+1] to E[2k], ..., E[(j−1)k+1] to E[jk] disposed in the area where the same first touch electrode Tx is formed overlaps at least during the period in which the touch driving signal Td is supplied to the corresponding first touch electrode Tx may receive the same emission control signal EM simultaneously.

As described above, for example, as shown in FIGS. 1 to 4, the present invention selects the pixels in the line unit while supplying the scanning signal to the scan lines S1 to Sn and input the data signal to the selected pixels 10 while supplying the data signal to the data lines D1 to Dm when the scanning signal is supplied. In addition, the present invention controls a light emitting period of the pixels 10 while supplying the emission control signal EM to the emission control lines E1 to En formed in parallel with the scan lines S1 to Sn to display the image. And thus, the display device integrated with the touch screen panel using as the first touch electrode Tx for the touch driving the pixel electrode provided to the pixels 10 (for example, the common electrode 110) is provided. Further, the period for displaying the image and the period for driving the touch drive without a division in the time division type, thereby making it possible to implement the image display and touch driving at the same time.

Furthermore, the present invention supplies the plurality of the emission control signal EM to each of the emission control lines E during the one frame 1F period and the plurality of the touch driving signal Td to each of the first touch electrodes Tx to thereby effectively improve the response speed of the touch screen panel.

To this end, a driving method of the display device integrated with the touch screen panel includes sequentially supplying the touch driving signal Td to the plurality of the first touch electrodes Tx formed in the same direction with the scan lines S and the emission control lines E; and detecting the change in the capacitance applied to the second touch electrodes Rx formed so as to be spaced apart by intersect with the first touch electrodes Tx to sense whether the touch screen panel is touched and to sense the touch position when the touch driving signal Td is supplied. Here, the plurality of the emission control signal EM is supplied through each of the emission control liens E during the one frame 1F period, and the touch driving signal Td is supplied to the first touch electrode Tx connected with the pixels 10 receiving the emission control signal EM during the corresponding period among the each period in which the plurality emission control signal EM is supplied. In addition, the pixel power (for example, the second pixel power ELVSS) is supplied to the remaining first touch electrodes Tx.

Meanwhile, the same emission control signal EM is simultaneously supplied to the emission control lines E[1] to E[k], E[k+1] to E[2k], . . . , E[(j−1)k+1] to E[jk] disposed in the area where the same first touch electrode Tx among the emission control lines E is formed. Although FIG. 5 shows the case in which the emission control signals EM supplied to the emission control lines E disposed in the area where the different first touch electrode Tx is formed are not overlap with each other, the present invention is not necessarily limited thereto.

For example, the same emission control signal EM may be simultaneously supplied to the emission control lines E of the pixels connected to the at least two of the first touch electrode Tx. Hereinafter, the driving method of the display device integrated with the touch screen panel will be described in detail with reference to FIG. 6.

Figure 6:
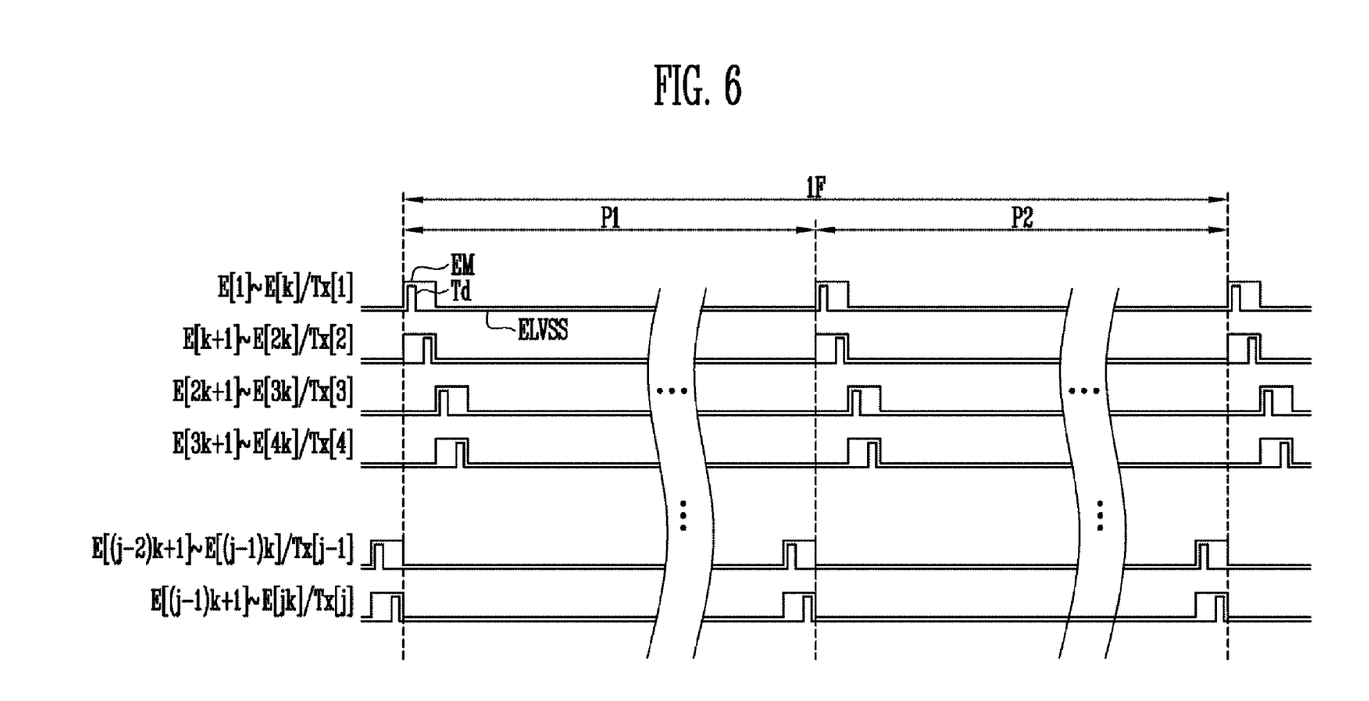
FIG. 6 is a waveform view showing a driving method of a display device integrated with a touch screen panel according to another embodiment of the present invention.

FIG. 6 is a waveform view showing a driving method of a display device integrated with a touch screen panel according to another exemplary embodiment of the present invention. For convenience, in describing FIG. 6, the same or similar parts to those of FIG. 5 are denoted by the same reference numerals and therefore, and the detailed description thereof will be omitted.

Referring to FIG. 6, the same emission control signal EM may be supply at the same time to the emission control lines E of the pixels connected to at least two of the first touch electrodes Tx adjacent to each other among the emission control lines E. However, in this case, each of the first touch electrodes Tx receives the touch driving signal Td in different time.

For example, the emission control lines E[k+1] to E[2k] of the pixels connected to the first touch electrode Tx[1] of the first horizontal line and the emission control lines E[k+1] to E[2k] of the pixels connected to the first touch electrode Tx[2] of the second horizontal line may receive the same emission control signal EM simultaneously. However, the first touch electrode Tx[1] of the first horizontal line and the first touch electrode Tx[2] of the second horizontal line are sequentially selected during the period in which the emission control signal EM is supplied to receive the touch driving signal Td. Therefore, the touch input generated to the first touch electrode Tx[1] of the first horizontal line and the touch input generated to the first touch electrode Tx[2] of the second horizontal line may sense by dividing from each other.

In the case of an exemplary embodiment shown in FIG. 6, the emission control signal EM may be set to have a width wider, for example, twice, compared to the exemplary embodiment shown in FIG. 5. In the case in which it will not consider the time required in order to change the voltage level of the emission control signal EM, the time capable of applying the touch driving signal Td may be the same the exemplary embodiment shown in FIG. 5.

However, actually, the delay occurs at the time of changing of the voltage level of the light-emitting control signals EM, when considering that the touch driving signal Td may be supplied in such a delay section, In the case of the embodiment shown in FIG. 6, the time capable of supplying the touch driving signal Td as much as the delay time generating when the voltage level of the emission control signal EM is changed may further ensure even if the light emitting period decrease slightly compared to the exemplary embodiment shown in FIG. 5, thereby making it possible to reduce noise. Therefore, the sensitivity of the touch screen panel may be improved.

According to the embodiment of the present invention as described above, the pixel electrodes provided in the pixel in order to display the image are patterned and then used as the touch electrodes in order to implement the touch screen panel, thereby making it possible to provide the display device integrated with a touch screen panel having the simple structure.

In addition, according to the embodiment of the present invention, while the touch driving signal is sequentially supplied to the touch electrodes to sense whether the touch screen panel is touched and a position, the pixel power is supplied to the remaining touch electrodes other than the touch electrode receiving the touch driving signal during the corresponding period among the touch electrodes to allow to serve as the pixel electrode, thereby making it possible to simultaneously drive the touch screen panel during the period in which the image is displayed. Therefore, according to the embodiment of the present invention increases the efficiency of a time application and secures the driving time to thereby stably drive the touch screen panel.

Furthermore, according to the embodiment of the present invention, the plurality of the emission control signals are supplied to each of the emission control lines during one frame period and the touch driving signals are supplied to the touch electrodes during each period in which the plurality of emission control signals are supplied, such that the plurality touch driving periods are disposed within one frame period. As a result, the driving frequency of the touch screen panel increases, thereby making it possible to improve the response speed.

By way of review and summation, however, when the touch screen panel is separately manufactured and is then attached to outer surface of the display device, the overall thickness of the display device is increased and a visibility of an image may be deteriorated, thereby increasing a process time and a manufacturing cost.

Therefore, the demand for development of a display device integrated with a touch screen panel that the touch screen panel and the display device are integrated with each other has been increase. However, when the touch screen panel and the display device are integrated with each other, the touch screen panel is provided together with the display device, such that it is difficult to secure a fast response speed for the touch screen panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device integrated with a touch screen panel, comprising:
a pixel unit including a plurality of scan lines and data lines intersecting with each other, a plurality of emission control lines formed in parallel with the scan lines, and a plurality of pixels connected to the scan lines, the emission control lines, and the data lines, each pixel including a first and second pixel electrodes;
a plurality of first touch electrodes formed on the pixel unit and parallel to a first direction, each first touch electrode integrally formed with the second pixel electrodes that are disposed within a same region as the respective first touch electrode; and
a plurality of second touch electrodes formed on the pixel unit and parallel to a second direction intersecting with the first direction, each second touch electrode disposed spaced-apart from the first touch electrodes,
the display device integrated with a touch screen panel supplying an emission control signal controlling the pixels not to emit light to each emission control line at least twice during one frame period, and supplying a touch driving signal to the first touch electrode connected with the pixels receiving the emission control signal while supplying a second pixel power to the remaining first touch electrodes connected with the pixels not receiving the emission control signal at a time in the frame period.

2. The display device according to claim 1, wherein the first touch electrodes are formed in a same direction with the scan lines and the emission control lines, and each first touch electrode overlaps with a plurality of pixel lines in which the plurality of scan lines and emission control lines are disposed.

3. The display device according to claim 2, wherein the emission control lines coupled to the pixels connected to the same first touch electrode are configured to receive the emission control signal at a same time.

4. The display device according to claim 2, wherein the emission control lines of the pixels connected to at least two of the first touch electrodes adjacent to each other are configured to receive the emission control signal at a same time.

5. The display device according to claim 2, wherein the emission control lines coupled to the pixels connected to the same first touch electrode are electrically connected.

6. The display device according to claim 1, wherein each pixel is configured to include at least an organic light emitting diode, and the first and second pixel electrodes are an anode electrode and a cathode electrode of the organic light emitting diode, respectively.

7. The display device according to claim 6, wherein each anode electrode is spaced apart from each other, and the cathode electrodes that are formed within a same region as one of the first touch electrodes are directly and electrically connected to each other.

8. The display device according to claim 1, wherein a first pixel power is supplied to the first pixel electrode, and the second pixel power and the touch driving signal is alternately supplied to the second pixel electrode.

9. The display device according to claim 1, wherein the display device is configured to sense a touch input by detecting a change in capacitance applied to the second touch electrodes corresponding to the touch driving signal supplied to the first touch electrode.

10. A driving method of a display device integrated with a touch screen panel, the driving method comprising:
sequentially supplying a touch driving signal to a plurality of first touch electrodes integrally formed with a pixel electrode in a same direction with scan lines and emission control lines; and
detecting a change in capacitance applied to second touch electrodes spaced apart by intersect with the first touch electrodes to sense a touch input when the touch driving signal is supplied, and further comprising:
supplying an emission control signal controlling pixels not to emit light to each emission control line at least twice during one frame period, and supplying a touch driving signal to the first touch electrode connected with the pixels receiving the emission control signal while supplying a second pixel power to the remaining first touch electrodes connected with the pixels not receiving the emission control signal at a time in the frame period.

11. The method according to claim 10, wherein each of the first touch electrodes overlap with a plurality of pixel lines in which the plurality of scan lines and emission control lines are disposed, and the same emission control signal is supplied to the emission control lines coupled to the pixels connected to the same first touch electrode at a same time.

12. The method according to claim 11, wherein the emission control lines of the pixels connected to at least two adjacent first touch electrodes are configured to receive the same emission control signal at the same time.

13. The method according to claim 12, wherein the first touch electrodes sequentially receive the touch driving signal while the emission control signal is supplied.

14. The method according to claim 10, further comprising:
sequentially supplying scanning signals to the scan lines in order to select pixels in a row;
supplying data signals to the selected pixels; and
controlling a light emitting periods of the pixels by supplying the emission control signal to each emission control line in parallel with the scan lines, at least twice in one frame period.

* * * * *